(12) United States Patent
Izumino et al.

(10) Patent No.: US 8,342,969 B2
(45) Date of Patent: Jan. 1, 2013

(54) TRIPOD-TYPE CONSTANT-VELOCITY UNIVERSAL JOINT AND METHOD OF MANUFACTURING THE SAME

(75) Inventors: Junichi Izumino, Iwata (JP); Kenji Konaka, Iwata (JP)

(73) Assignee: NTN Corporation, Osaka (JP)

( * ) Notice: Subject to any disclaimer, the term of this patent is extended or adjusted under 35 U.S.C. 154(b) by 12 days.

(21) Appl. No.: 13/055,219

(22) PCT Filed: Jul. 29, 2009

(86) PCT No.: PCT/JP2009/063514
§ 371 (c)(1), (2), (4) Date: Jan. 21, 2011

(87) PCT Pub. No.: WO2010/024083
PCT Pub. Date: Mar. 4, 2010

(65) Prior Publication Data
US 2011/0130211 A1    Jun. 2, 2011

(30) Foreign Application Priority Data
Aug. 28, 2008  (JP) .................... 2008-220045

(51) Int. Cl.
*F16D 3/205* (2006.01)
*B23P 11/00* (2006.01)
(52) U.S. Cl. ...... 464/111; 464/905; 72/352; 29/DIG. 18
(58) Field of Classification Search .................. 464/111, 464/120–123, 132, 905; 72/352; 29/DIG. 18
See application file for complete search history.

(56) References Cited

U.S. PATENT DOCUMENTS 4,971,595 A * 11/1990 Sasaki et al. .................. 464/111
(Continued)

FOREIGN PATENT DOCUMENTS

JP    2000-320563    11/2000
(Continued)

OTHER PUBLICATIONS

"Economic Advantages." Scot Forge. Jan. 25, 2007, [online], [retrieved on Apr. 18, 2012] Retrieved from the Internet <URL: http://web.archive.org/web/20070125010414/http://www.scotforge.com/sf_facts_econadv.htm>.*

(Continued)

*Primary Examiner* — Gregory Binda
*Assistant Examiner* — Josh Skroupa
(74) *Attorney, Agent, or Firm* — Wenderotth, Lind & Ponack, L.L.P.

(57) ABSTRACT

A tripod-type constant-velocity universal joint has a journal raw profile with reduced weight and a reduced number of manufacturing steps. A leading end corner portion of the journal raw profile is held with use of a die and forged. By the forging, at the part including an elliptically longitudinal side relatively on a leading end portion side of an outer peripheral surface of each of journals, edge portions reducing a lateral sectional area of each of the journals toward a leading end side thereof are formed, and tapered surfaces are formed on the leading end side of the edge portions. Centering on each of the journals is performed by causing two points on an elliptically longitudinal side of the edge portions to abut against a centering jig.

11 Claims, 7 Drawing Sheets

U.S. PATENT DOCUMENTS

| | | | |
|---|---|---|---|
| 6,475,092 B1 | 11/2002 | Kura et al. | |
| 6,478,682 B1 | 11/2002 | Kura et al. | |
| 6,579,188 B1 | 6/2003 | Kura et al. | |
| 7,118,485 B2 * | 10/2006 | Sugiyama et al. | 464/111 |
| 2003/0130045 A1 | 7/2003 | Kura et al. | |
| 2004/0209693 A1 | 10/2004 | Kura et al. | |
| 2008/0058107 A1 * | 3/2008 | Cho et al. | 464/111 |

FOREIGN PATENT DOCUMENTS

| | | |
|---|---|---|
| JP | 2001-234941 | 8/2001 |
| JP | 2003-343592 | 12/2003 |
| JP | 2004-162791 | 6/2004 |
| JP | 2008-164129 | 7/2008 |

OTHER PUBLICATIONS

"Forging Advantages." Scot Forge. Feb. 24, 2007, [online], [retrieved on Apr. 18, 2012] Retrieved from the Internet <URL: http://web.archive.org/web/20070224135255/http://www.scotforge.com/sf_facts_forgingadv.htm>.*

International Preliminary Report on Patentability and Written Opinion of the International Searching Authority issued Apr. 21, 2011 in International (PCT) Application No. PCT/JP2009/063514.

International Search Report issued Sep. 1, 2009 in International (PCT) Application No. PCT/JP2009/063514.

* cited by examiner direction along the axis direction along the axis

TRIPOD-TYPE CONSTANT-VELOCITY UNIVERSAL JOINT AND METHOD OF MANUFACTURING THE SAME

TECHNICAL FIELD

The present invention relates to a tripod-type constant-velocity universal joint as one of plunging-type constant-velocity universal joints which are used for drive shafts of automobiles or in various industrial machines, for transmitting rotational torque, and relates to a method of manufacturing the same.

BACKGROUND ART

The tripod-type constant-velocity universal joint is one of the plunging-type constant-velocity universal joints, and hence is used at points for which angular displacement and axial displacement (plunging) are necessary. Examples thereof include a drive shaft for transmitting power from an engine to drive wheels, which is attached on the engine side of an intermediate shaft (shaft) constituting the drive shaft. Note that, a fixed-type constant-velocity universal joint which allows only angular displacement is attached on the drive wheel side of the shaft.

Well-known examples of the tripod-type constant-velocity universal joint include that of a single-roller type in which single rollers serving as torque transmitting elements are provided and that of a double-roller type in which double rollers are provided.

Well-known examples of the tripod-type constant-velocity universal joint of the double-roller type also include a tripod-type constant-velocity universal joint capable of suppressing vibration at the time of operation. FIG. 9 illustrates an example thereof, and FIG. 10 illustrates a lateral sectional view of FIG. 9 (sectional view taken in a direction orthogonal to an axial line of a joint) (Patent Document 1).

The tripod-type constant-velocity universal joint 101 includes a main portion constituted by an outer race 102 serving as an outer joint member, a tripod member 103 as an inner joint member having three journals 104 protruding in a radial direction, and roller units U serving as the torque transmitting elements.

The outer race 102 has a bottomed cylindrical shape of having an opening portion at one end thereof, and three linear track grooves 114 are equiangularly formed in the inner peripheral surface thereof. On the inside of the outer race 102, the tripod member 103 having the three journals 104 and the roller units U are accommodated. A center hole 110 is formed in the tripod member 103, and a shaft 109 is inserted into the center hole 110 and spline-fitted thereto. The shaft 109 is prevented from being detached from the center hole 110 of the tripod member 103 by means of an annular snap ring 111.

As illustrated in FIG. 11, each of the three journals 104 protruding on the tripod member 103 has, in lateral cross-section (cross-section taken in the direction orthogonal to the axial line of each of the journals), an elliptical shape longitudinal in a direction orthogonal to the axial line of the joint, and rotatably supports each of the roller units U. Further, each of the journals 104 has a straight shape (refer to FIGS. 9 and 10) in vertical cross-section (cross-section taken along a direction of the axial line of each of the journals).

The roller units U are accommodated in the track grooves 114 of the outer race 102 and moved in an axial direction by being guided along roller guide surfaces 108 of the track grooves 114. Further, each of the roller units U includes a main portion constituted by an outer roller 105, an inner roller 107 arranged on the inner peripheral surface of the outer roller 105 and fitted around each of the journals 104, and needle rollers 106 interposed between the outer roller 105 and the inner roller 107. As illustrated in FIGS. 9 and 10, by means of ring-shaped washers 112 and 113, the needle rollers 106 are prevented from being detached from each of the roller units U to the shaft 109 side or the inner peripheral surface side of the outer race 102. Note that, each of the journals 104 is held in contact with the inner roller 107 in the direction orthogonal to the axial line of the joint, that is, on the elliptically longitudinal side (most longitudinal parts of the ellipse), and has a gap 150 formed between each of the journals 104 and the inner roller 107 in the direction of the axial line of the joint.

DOCUMENT LIST

Patent Document

Patent Document 1: JP 2000-320563 A

SUMMARY OF THE INVENTION

Problems to be Solved by the Invention

In the tripod-type constant-velocity universal joint 101 illustrated in FIGS. 9 and 10, centering is performed on the three journals 104 protruding on the tripod member 103 at the time of finishing. Therefore, in a leading end corner portion of each of the journals 104, it is necessary to form a centering reference, in other words, an edge portion at which centering can be performed by causing each of the journals 104 to abut against a centering jig. The forming method and the method of performing centering on each of the journals 104 are described with reference to FIGS. 12 to 14.

First, as illustrated in FIG. 12, an outer surface of a journal raw profile 204 constituting a part of a raw profile of the tripod member 103 is held with use of a die X and forged. As a result, each of the journals 104 is formed as illustrated in FIG. 13.

In the above-mentioned forging, the entire of the leading end portion of the journal raw profile 204 is held with use of the die X, and hence it is difficult to fill an inner wall corner portion 231 of the die X with the journal raw profile 204. Thus, at the time of forging step, as illustrated in FIG. 12, a gap 130 is formed between a leading end corner portion 232 of the journal raw profile 204 and the inner wall corner portion 231 of the die X. As a result, as illustrated in FIG. 13, each of the journals 104 is formed into a shape in which the leading end corner portion exhibits a shape of a smooth curve. However, the leading end corner portion of each of the journals 104 is not held with use of the die X at the time of forging, and hence it is difficult to strictly design the shape thereof. Therefore, it is difficult to perform centering on each of the journals 104 while the centering jig is caused to abut against the leading end corner portion.

Thus, as illustrated in FIG. 13, the entire of the leading end portion of each of the journals 104 molded by forging is turned and removed (turned portion is indicated by a hatched region in FIG. 13), whereby the leading end corner portion constitutes an edge portion 121. The edge portion 121 is formed over a circumferential direction of each of the journals 104. Note that, after turning described above, burrs are left on the edge portion 121 in some cases. In those cases, it is necessary to remove the burrs. Examples of the method thereof include tunbling or shotblasting.

Lastly, as illustrated in FIG. 14, the edge portion 121 of each of the journals 104 is caused to abut against the inner wall constituting a recessed portion 140 formed in a centering jig Y which has a mortar-like shape, and force in a direction indicated by a hollow arrow D is applied to the centering jig Y. With this, an axial center α of each of the journals 104 is corrected so as to be orthogonal to an axial line O of the joint in a radial direction, whereby centering can be performed on each of the journals 104. The inner wall constituting the recessed portion 140 of the centering jig Y is constituted by a flat surface 142 and tapered surfaces 141 extending from both end portions of the flat surface 142 to the tripod member 103 side. When centering described above is performed on each of the journals 104, the edge portion 121 of each of the journals 104 is caused to abut against the tapered surfaces 141 of the centering jig Y, with a gap being formed between the flat surface 142 of the centering jig Y and a leading end surface of each of the journals 104. Note that, against the centering jig Y, two points opposed to each other in the edge portion 121 of each of the journals 104 through an intermediation of the axial center α of each of the journals 104, specifically, two points constituting an elliptically longitudinal side are caused to abut. In this case, it is possible to stabilize the contact state of the centering jig Y with respect to the edge portion 121 of each of the journals 104, and hence possible to reliably perform centering on each of the journals 104.

In the case of the tripod-type constant-velocity universal joint 101 and the method of manufacturing the same, which have been described hereinbefore, the leading end portion of each of the journals 104 has to be turned and removed after being molded by forging so that the centering reference is formed. Therefore, it is necessary to enlarge the journal raw profile 204 in consideration of turning amount of the leading end portion, whereby there arises a problem in that weight of the journal raw profile 204 is increased. Further, the leading end portion of each of the journals 104 has to be turned, and in addition, after turning, when burrs (surplus portions formed around a molded product in steps of working metal, plastic, or the like) are left on the edge portion 121, it becomes necessary to perform a step of removing the burrs. Therefore, the number of steps of manufacturing the tripod-type constant-velocity universal joint 101 is increased, which leads to a problem of increase in manufacturing cost of the tripod-type constant-velocity universal joint 101.

Further, at the time of forging the journal raw profile 204, in order to reduce as much as possible the gap 130 formed between the inner wall corner portion 231 of the die X and the leading end corner portion 232 of the journal raw profile 204, it is necessary to strictly regulate conditions at the time of forging the journal raw profile 204 (size of journal raw profile 204, setting condition of forging machine, and the like). Therefore, it becomes difficult to forge the tripod-type constant-velocity universal joint 101.

The present invention has been made in view of the above-mentioned problems, and provides a tripod-type constant-velocity universal joint which is capable of reducing the weight of the journal raw profile to thereby reduce the number of manufacturing steps and in which forging of the journals is facilitated, and a method of manufacturing the same.

Means for Solving the Problems

In order to solve the above-mentioned problems, according to the present invention, provided is a method of manufacturing a tripod-type constant-velocity universal joint which includes: an outer joint member having an inner peripheral surface in which three linear track grooves extending in an axial direction are formed; a tripod member which has three journals protruding in a radial direction and is arranged on an inside of the outer joint member; and a torque transmitting element supported by means of each of the journals and guided along a roller guide surface of each of the track grooves, characterized in that, when a journal raw profile is forged with use of a die, in a state in which a relief portion is provided on a leading end side of the journal raw profile with use of the die, a part including two points opposed to each other in an leading end corner portion of the journal raw profile through an intermediation of an axial center is held with use of the die.

In the case of the above-mentioned invention, when the journal raw profile as a forged body for molding each of the journals is held and forged with use of the die, the journal raw profile plastically flows into the relief portion and firmly adheres to the inner wall of the die. As a result, a gap is not formed between the die and the journal raw profile (particularly, leading end corner portion). Thus, each of the journals can be molded into a shape conformed to the inner wall of the die, specifically, into a shape of having the edge portions reducing the lateral sectional area of each of the journals (area of cross-section taken in the direction orthogonal to the axial line of each of the journals) at a part including the two points opposed to each other on the outer peripheral surface thereof through an intermediation of the axial center (axial center of each of the journals).

The edge portions can be used as centering references (parts against which a jig is caused to abut) for performing centering on each of the journals. As a result, it becomes unnecessary to perform, after molding each of the journals by forging, a conventional step of forming centering references by turning and burring the leading end portion.

Further, when centering is performed on each of the journals, it is necessary to cause the jig or the like to abut against at least two points through an intermediation of the axial center on the outer peripheral surface of each of the journals. In this context, in the present invention, the part of the leading end corner portion of the journal raw profile, which includes the two points opposed to each other through an intermediation of the axial center of the journal raw profile, is held with use of the die, whereby the edge portions serving as the centering references are formed at the two points opposed to each other on the outer peripheral surface of each of the journals through an intermediation of the axial center. Thus, the two points opposed to each other in the edge portions through an intermediation of the axial center of each of the journals are caused to abut against the jig, whereby centering on each of the journals can be reliably performed.

As in the present invention described above, as means for holding the leading end corner portion of the journal raw profile with use of the die in a state in which a relief portion is provided on the leading end side of the journal raw profile, it is desirable to form the inner walls of the part of the die, at which the leading end corner portion of the journal raw profile is held, into shapes of being narrowed toward the leading end side of the journal raw profile.

In the present invention described above, it is desirable that tapering surfaces be provided in the inner walls of the part of the die at which the leading end corner portion of the journal raw profile is held.

In this case, the edge portions (centering references) are formed on the outer peripheral surface of each of the journals, and the tapered surfaces are formed on the leading end side of the edge portions. Thus, it becomes unnecessary to perform, after forging each of the journals, a step of forming centering references by turning and burring the leading end portion thereof. Therefore, the same effects as those of the present invention, which have already been described, can be obtained. Further, in the case of the above-mentioned invention, when the journal raw profile plastically flows at the time of forging the journal raw profile, it becomes easier to cause the journal raw profile to adhere to the tapering surfaces of the die. Thus, the above-mentioned operations and effects of the present invention can be reliably obtained.

The method of manufacturing the tripod-type constant-velocity universal joint, which has been described hereinbefore, can be adopted to well-known tripod-type constant-velocity universal joints such as one including the torque transmitting element of a single-roller type and one including that of a double-roller type. Note that, examples of the tripod-type constant-velocity universal joint of the double-roller type include a tripod-type constant-velocity universal joint in which: the torque transmitting element is constituted by the outer roller inserted into each of the track grooves of the outer joint member and the inner roller arranged on the inner peripheral side of the outer roller and fitted around each of the journals; and each of the journals has a straight shape of being orthogonal to an axial line of a joint in vertical cross-section, is held in contact with an inner peripheral surface of the inner roller in a direction orthogonal to the axial line of the joint in lateral cross-section, and has a gap formed between each of the journals and the inner peripheral surface of the inner roller in a direction of the axial line of the joint, whereby vibration is suppressed.

In the method of manufacturing the tripod-type constant-velocity universal joint according to the present invention, which has been described hereinbefore, it is desirable that, when the journal raw profile has an elliptical shape in the lateral cross-section (cross-section taken in the direction orthogonal to the axial line of the journal raw profile), a part including an elliptically longitudinal side of the leading end corner portion of the journal raw profile be held with use of the die.

In this case, the journals exhibiting elliptical shapes in lateral cross-section are molded. When centering is performed on each of the journals, it is necessary to cause the centering jig to abut against the parts on the elliptically longitudinal side of each of the journals. This is because, when the centering jig is caused to abut against parts other than those on the elliptically longitudinal side of each of the journals, the contact state of the centering jig with respect to each of the journals becomes unstable, and hence it becomes difficult to precisely perform centering on each of the journals. In the case of the above-mentioned invention which has been made in consideration of the circumstances, the centering reference of each of the journals can be formed on the elliptically longitudinal side of each of the journals. Therefore, centering on each of the journals can be reliably performed by causing the centering jig to abut against the elliptically longitudinal side of each of the journals.

Note that, in the tripod-type constant-velocity universal joint of the present invention, which has been described hereinbefore, the edge portions are capable of performing centering by being caused to abut against the centering jig, and the sizes, the shapes, and the positions thereof are not particularly limited without departing from the technical idea described in Scope of Claims. Owing to this, even when the inner walls of the part of the die, at which the leading end corner portion of the journal raw profile is held, do not constitute the tapering surfaces, as long as the leading end corner portion of the journal raw profile can be held in the state in which the relief portion is provided on the leading end side of the journal raw profile, and the edge portions serving as the centering references can be formed on the outer peripheral surface of each of the forged journals, the shape, the size, and the like of the die are not particularly limited.

EFFECTS OF THE INVENTION

According to the present invention, in the tripod-type constant-velocity universal joint and by the method of manufacturing the same, the edge portions serving as the centering references (parts against which a jig is caused to abut when performing centering) can be formed by forging on the outer peripheral surface of each of the journals. Thus, it becomes unnecessary to perform, after forging each of the journals, the conventional step of forming centering references by turning and burring the leading end portion thereof. As a result, it becomes unnecessary to increase the size of the journal raw profile in consideration of turning amount of the leading end portion, whereby weight of the journal raw profile can be reduced. Further, it is unnecessary to turn or burr the leading end portion of each of the journals after forging, and hence it is possible to reduce the number of manufacturing steps of the tripod-type constant-velocity universal joint, thereby possible to achieve manufacturing cost reduction of the tripod-type constant-velocity universal joint. Further, the entire of the leading end portion of the journal raw profile is not held with use of the die, and hence the journal raw profile is held at less points of the die as compared with conventional cases. Thus, it is possible to reduce the load applied to the die, and possible to increase the life of the die. In addition, at the time of molding the journals by forging, in order to bring the corner portion of the die and the leading end corner portion of the journal raw profile into close contact with each other, it is unnecessary to strictly regulate conditions at the time of forging the journal raw profile (size of journal raw profile, setting condition of forging machine, and the like). Therefore, forging of the tripod-type constant-velocity universal joint is facilitated.

DETAILED DESCRIPTION OF THE INVENTION

In the following, an embodiment of the present invention is described with reference to attached drawings (FIGS. 1 to 8).

Figure 5:
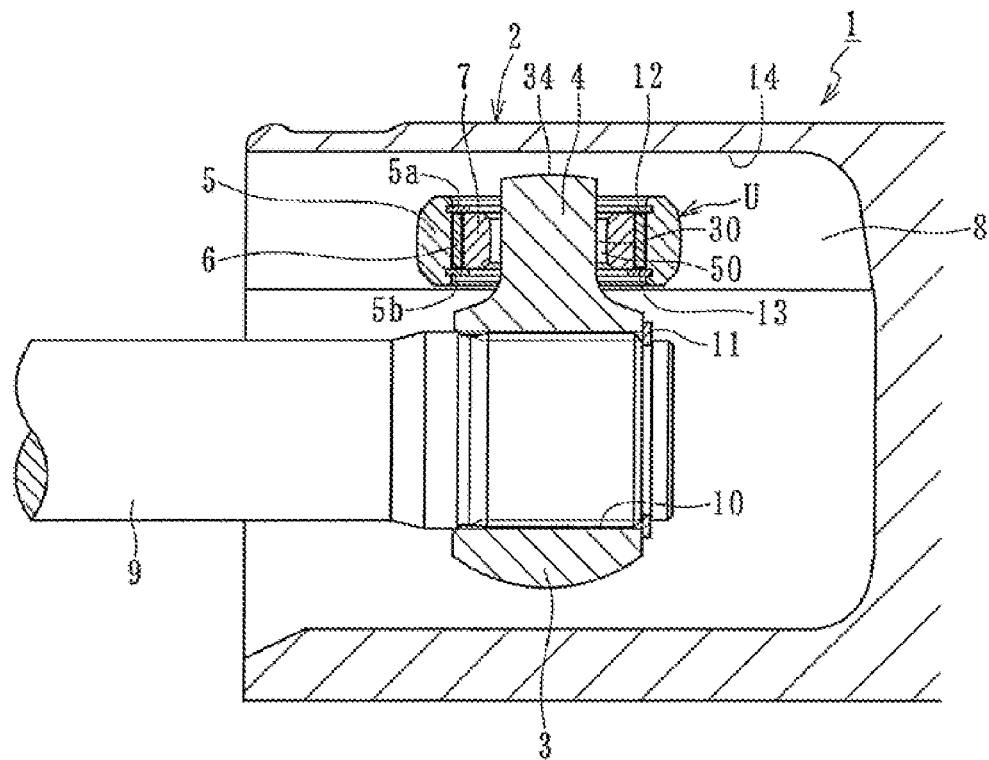
FIG. 5 is a sectional view illustrating an embodiment of the present invention.

FIG. 5 illustrates, as an embodiment of the present invention, a tripod-type constant-velocity universal joint of a double-roller type, which is capable of suppressing vibration. The tripod-type constant-velocity universal joint 1 includes a main portion constituted by an outer race 2 serving as an outer joint member, a tripod member 3 as an inner joint member having three journals 4 protruding in a radial direction, and roller units U serving as torque transmitting elements.

The outer race 2 has a bottomed cylindrical shape of having an opening portion at one end thereof, and three linear track grooves 14 are equiangularly formed in the inner peripheral surface thereof. On the inside of the outer race 2, the tripod member 3 having the three journals 4 and the roller units U are accommodated. A center hole 10 is formed in the tripod member 3, and a shaft 9 is inserted into the center hole 10 and spline-fitted thereto. The shaft 9 is prevented from being detached from the center hole 10 of the tripod member 3 by means of an annular snap ring 11 attached at the leading end portion thereof.

The roller units U are rotatably supported by means of the three journals 4 protruding on the tripod member 3.

Figure 7:
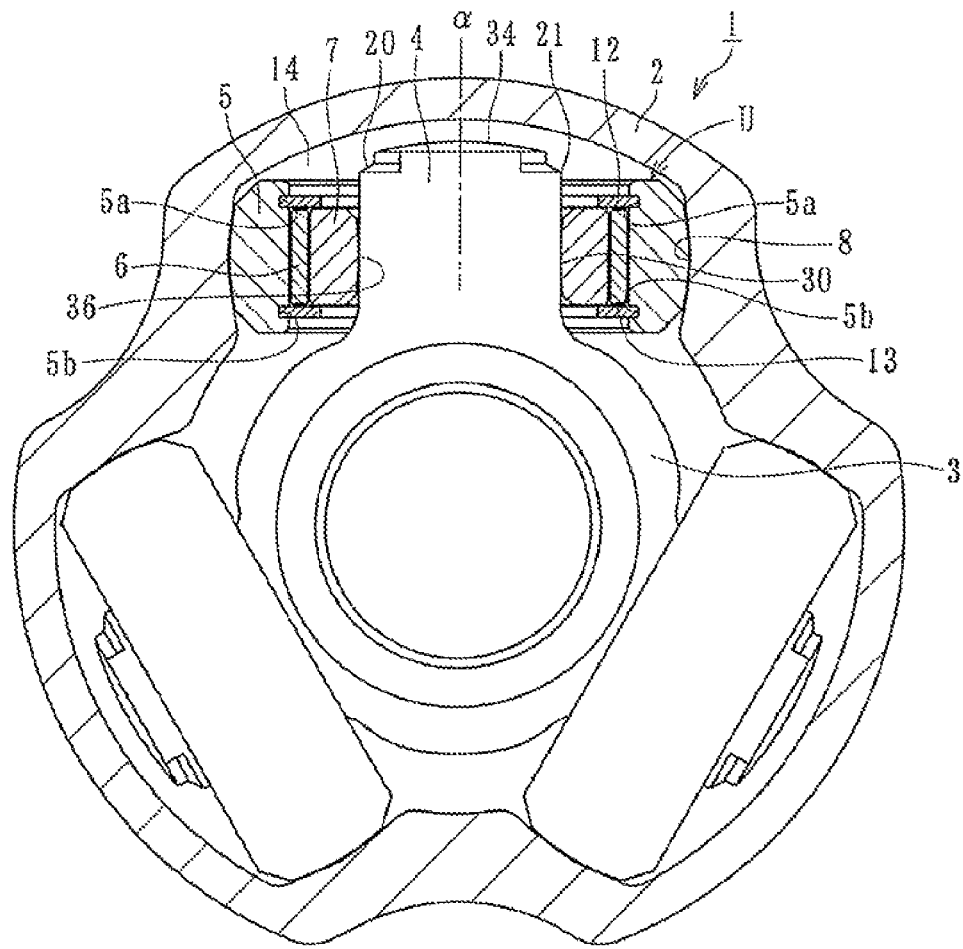
FIG. 7 is a lateral sectional view of the tripod-type constant-velocity universal joint illustrated in FIG. 5.

The roller units U are accommodated in the track grooves 14 of the outer race 2 and guided along roller guide surfaces 8 of the track grooves 14. Thus, the roller units U can be moved in an axial direction. Further, each of the roller units U includes a main portion constituted by an outer roller 5, an inner roller 7 arranged on the inner peripheral surface of the outer roller 5 and fitted around each of the journals 4, and needle rollers 6 interposed between the outer roller 5 and the inner roller 7. In the inner peripheral surface of the outer roller 5, at parts on the shaft 9 side (hereinafter, referred to as shaft side) and an inner peripheral surface side of the outer race 2 (hereinafter, referred to as outer race inner peripheral surface side), annular recessed grooves 5a and 5b are formed, and ring-shaped washers 12 and 13 are fitted to the recessed grooves 5a and 5b. By means of the washers 12 and 13, the needle rollers 6 are prevented from being detached from each of the roller units U to the shaft side or the outer race inner peripheral surface side. Note that, FIG. 7 illustrates a lateral sectional view (sectional view taken in a direction orthogonal to an axial line of a joint) of the tripod-type constant-velocity universal joint 1 illustrated in FIG. 5.

Figure 6:
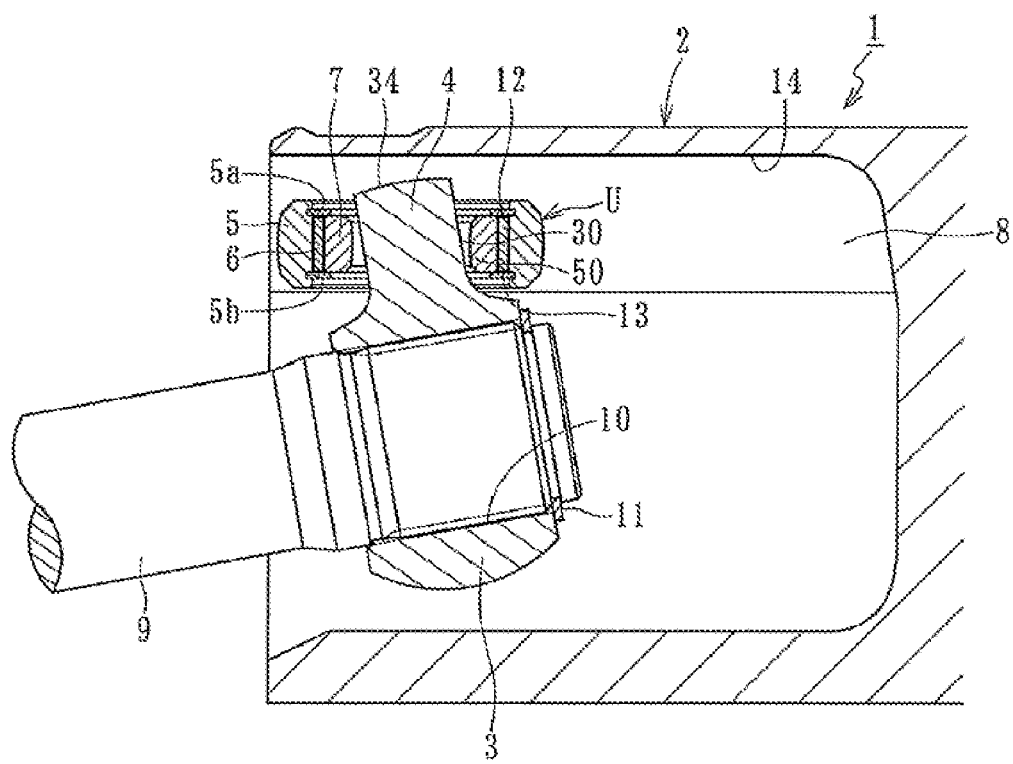
FIG. 6 is a sectional view illustrating a state in which the tripod-type constant-velocity universal joint illustrated in FIG. 5 forms an operating angle.
Figure 8:
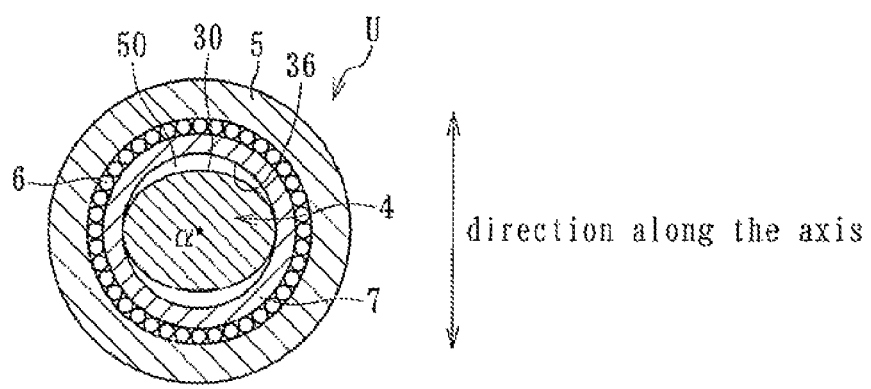
FIG. 8 is a lateral sectional view of the roller unit illustrated in FIG. 7.
Figure 9:
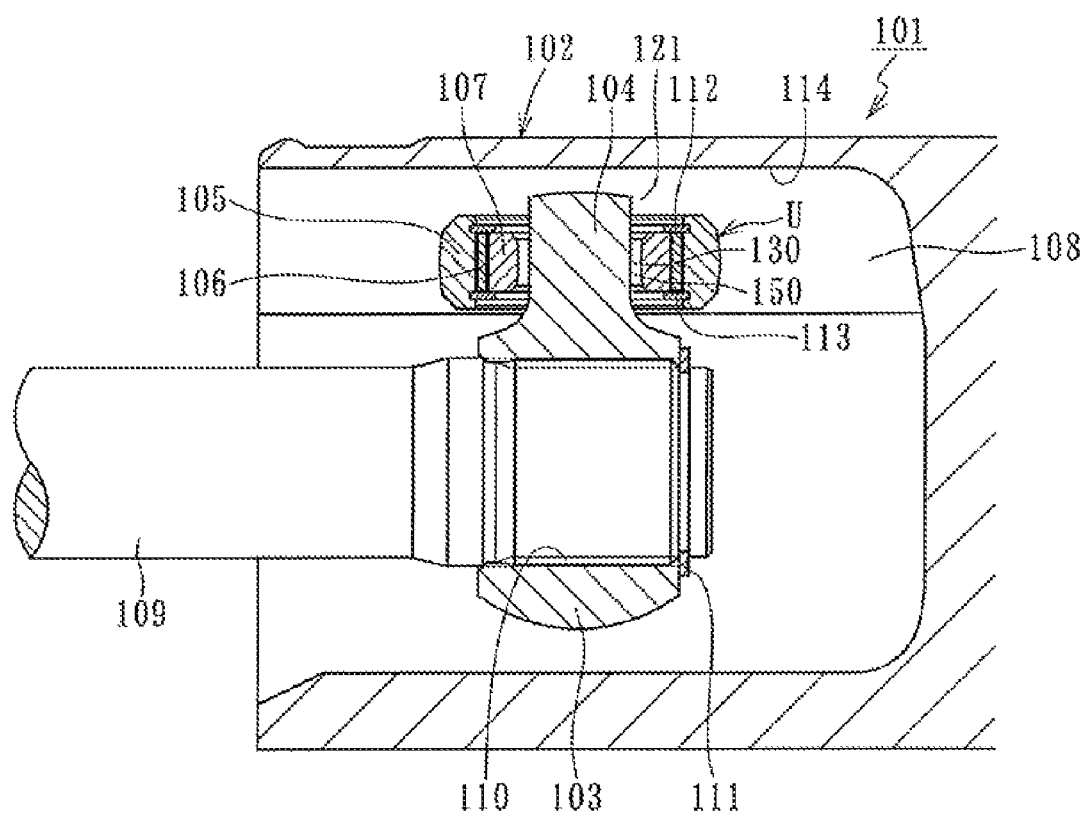
FIG. 9 is a sectional view of a conventional tripod-type constant-velocity universal joint.
Figure 10:
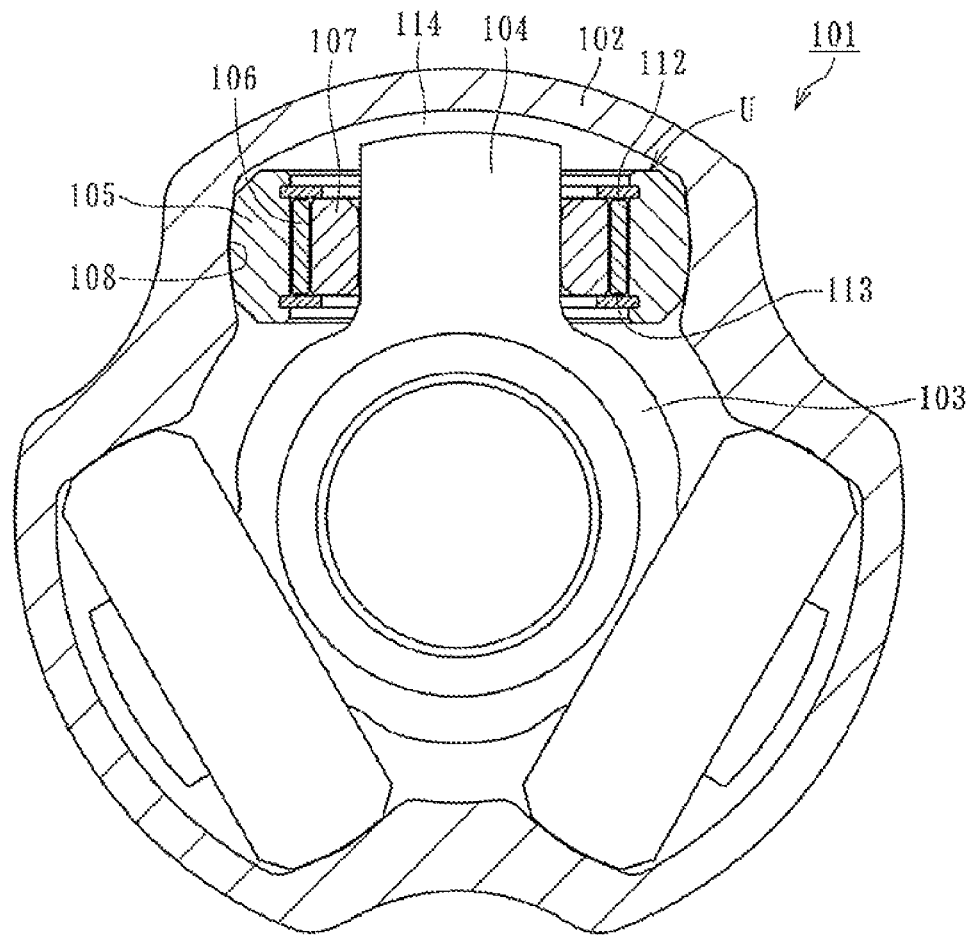
FIG. 10 is a lateral sectional view of the tripod-type constant-velocity universal joint illustrated in FIG. 9.
Figure 11:
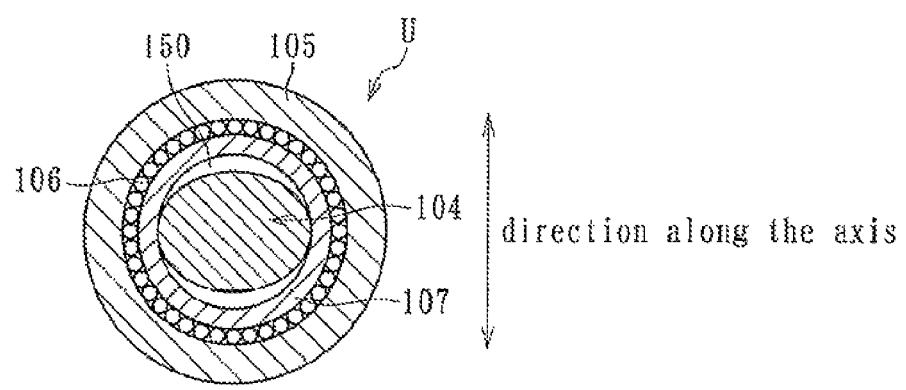
FIG. 11 is a lateral sectional view of the roller unit illustrated in FIG. 10.
Figure 12:
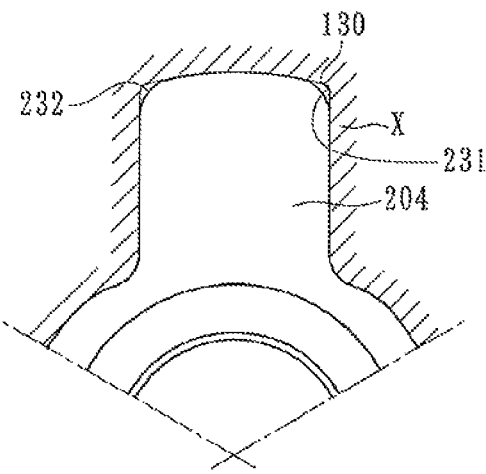
FIG. 12 is a front view for describing a forging step of the journal illustrated in FIG. 9.
Figure 13:
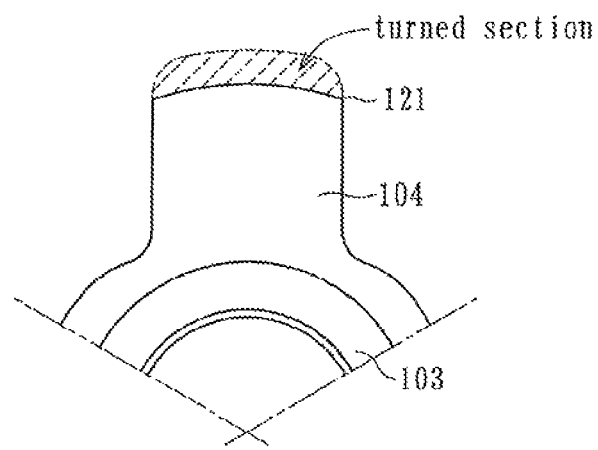
FIG. 13 is a front view for describing a step of turning and removing a leading end portion of the journal after the forging step illustrated in FIG. 12.
Figure 14:
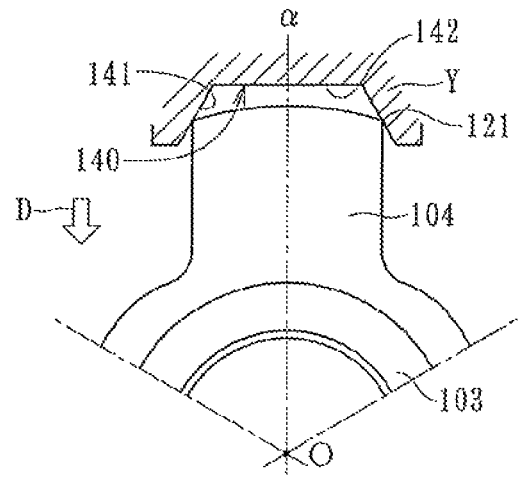
FIG. 14 is a front view for describing a method of performing centering on the journal molded in the forging step of FIG. 13.

As illustrated in FIG. 8, each of the journals 4 has an elliptical shape in lateral cross-section (cross-section taken in a direction orthogonal to an axial line of each journals 4). In a direction orthogonal to the axial line of the joint (direction on the elliptically longitudinal side), each of the journals 4 is held in contact with an inner peripheral surface 36 of the inner roller 7, and in the direction of the axial line (axial direction) of the joint, has a gap 50 between the inner peripheral surface 36 of the inner roller 7 and each of the journals 4. By means of the gap 50, as illustrated in FIG. 6, the roller units U are not inclined to the respective roller guide surfaces 8 even when an operating angle is formed. Therefore, the tripod-type constant-velocity universal joint 1 (refer to FIG. 5) is capable of suppressing vibration caused upon forming the operating angle. Further, each of the journals 4 has a straight shape in vertical cross-section (cross-section taken along a direction of the axial line of each journals 4) (refer to FIGS. 5 to 7).

A method of forging and molding the journals 4 in this embodiment and a method of performing centering on the journals 4 are described in the following with reference to FIGS. 1 to 4.

Figure 1:
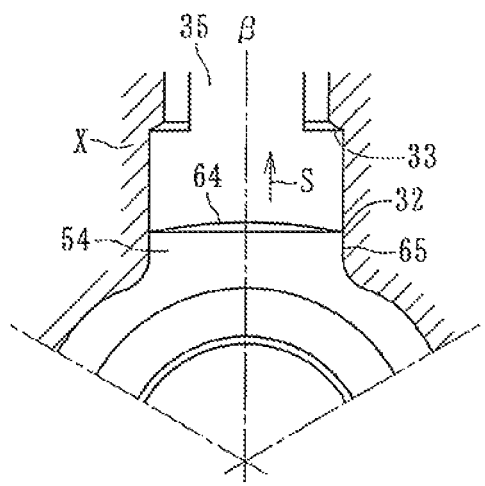
FIG. 1 is a front view for describing a forging step of a journal illustrated in FIG. 5, specifically, describing a method of causing forging to proceed while a journal raw profile is held with use of a die.
Figure 2A:
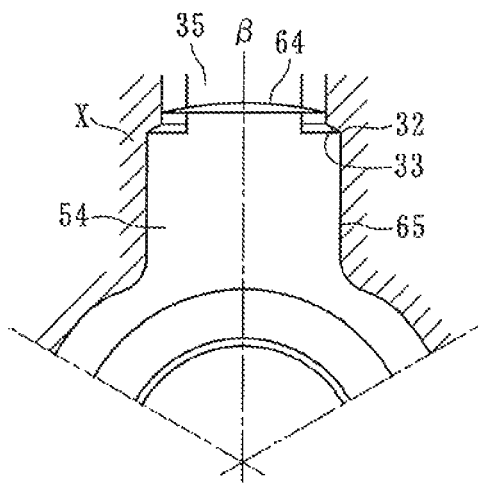
FIG. 2A is a front view for describing a state in which the step of FIG. 1 has proceeded, specifically, describing a state in which the journal raw profile is held with use of the die.

First, as illustrated in FIG. 1, an outer surface (outer peripheral surface 65) of a journal raw profile 54, which constitutes a part of a raw profile of the tripod member 3, is held with use of a die X, and force in the direction of the axial line of the joint (on the front side or the inner side of the figure) is gradually applied to the journal raw profile 54, whereby a leading end surface 64 plastically flows in a direction indicated by an arrow S. FIG. 2A illustrates a state in which the forging is caused to proceed, and FIG. 2B illustrates a plan view as seen from the leading end side of the journal raw profile 54 of FIG. 2A (upper side of the figure).

Figure 2B:
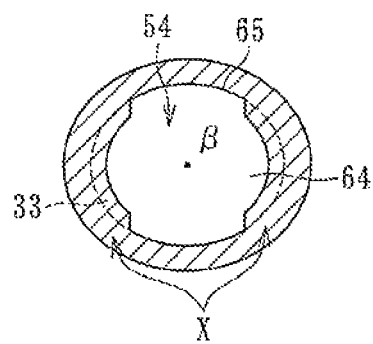
FIG. 2B is a plan view as seen from a leading end side of the journal raw profile of FIG. 2A.

As illustrated in FIG. 2B, the journal raw profile 54 has, in lateral cross-section (cross-section taken in a direction orthogonal to the axial line of journal raw profile 54), an elliptical shape longitudinal in a direction orthogonal to an axial center β (axial center of journal raw profile 54). Further, the inner walls of a part of the die X, at which a leading end corner portion 32 of the journal raw profile 54 is held, constitute tapering surfaces 33. The inner walls of the part of the die X, at which the leading end corner portion 32 of the journal raw profile 54 is held, exhibit shapes of being narrowed toward the leading end side of the journal raw profile 54. Herein, the expression "narrowed toward the leading end side of the journal raw profile 54" means that, in the inner walls of the die X, the holding width in a direction orthogonal to the journal raw profile 54 is narrow toward the leading end side of the journal raw profile 54.

Further, as illustrated in FIGS. 1 and 2A, when, in the leading end corner portion 32 of the journal raw profile 54, a relief portion 35 is provided on the leading end side of the die X, there is held, with use of the die X, a part including two points opposed to each other through an intermediation of the axial center β of the journal raw profile 54, specifically, a part including two points on the elliptical longitudinal side (left and right sides in the figure), which are to be held in contact with the inner peripheral surface 36 of the inner roller 7 (refer to FIGS. 7 and 8) after molding. With this forging, the journal raw profile 54 plastically flows into the relief portion 35 and is held in contact with the inner walls including the tapering surfaces 33 of the die X without involving a gap between the die X and the journal raw profile 54 (specifically, leading end corner portion 32).

Figure 3A:
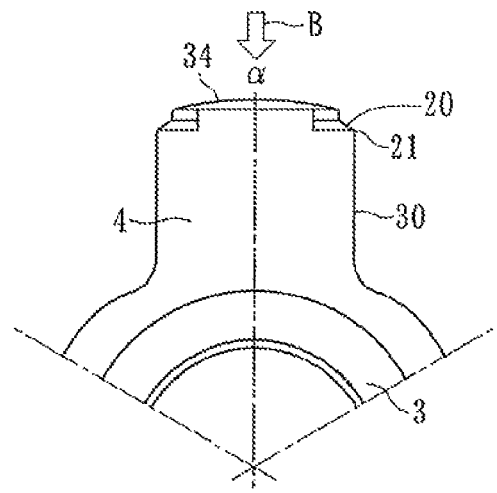
FIG. 3A is a front view illustrating the journal illustrated in FIGS. 2A and 2B, which is molded by the forging step.
Figure 3B:
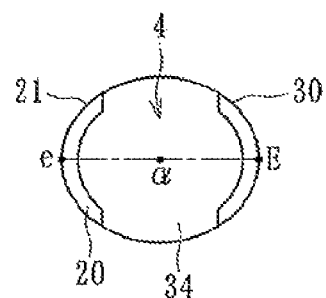
FIG. 3B is a plan view as seen in a direction indicated by a hollow arrow B of FIG. 2A.

With the above-mentioned forging step, as illustrated in FIG. 3A, FIG. 3B which is a plane view as seen from a direction indicated by a hollow arrow B in FIG. 3A, and FIG. 7, each of the journals 4 is formed into a shape of having, at a part including two points opposed to each other through an intermediation of an axial center α of each of the journals 4, specifically, at a part including two points on the elliptical longitudinal side (left and right sides in the figure), edge portions 21 reducing the lateral sectional area of each of the journals 4 (cross-section taken in the direction orthogonal to the axial line of each journals 4) toward the leading end side thereof, and tapered surfaces 20 extending from the edge portions 21 to the leading end side thereof, the part being relatively on the leading end portion side of the outer peripheral surface 30.

Figure 4:
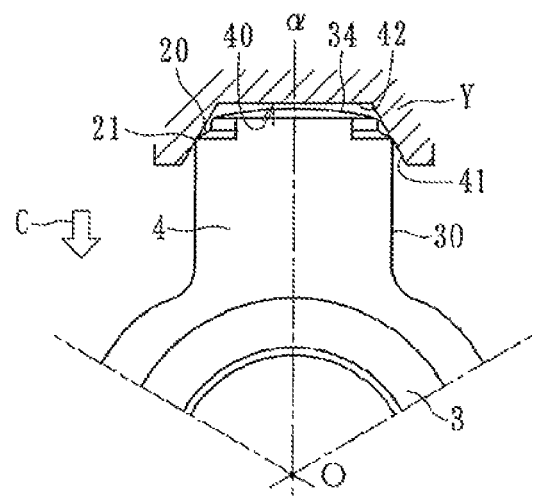
FIG. 4 is a front view for describing a method of performing centering on the journal illustrated in FIG. 3A.

Next, as illustrated in FIG. 4, the leading end portion of each of the journals 4 is caused to abut against the inner wall constituting a recessed portion 40 formed in a centering jig Y which has a mortar-like shape, and force in a direction indicated by a hollow arrow C is gradually applied to the centering jig Y. With this, the axial center α of each of the journals 4 is corrected so as to be orthogonal to an axial line O of the joint in a radial direction, whereby centering can be performed on each of the journals 4. The inner wall of the centering jig Y is constituted by a flat surface 42 and tapered surfaces 41 extending from both end portions of the flat surface 42 to the tripod member 3 side. When centering is performed on each of the journals 4, the edge portions 21 of each of the journals 4 are caused to abut against the tapered surfaces 41 of the centering jig Y, with a gap being formed between the flat surface 42 of the centering jig Y and a leading end surface 34 of each of the journals 4.

In this case, in each of the journals 4, the edge portions 21 to be held in contact with the tapered surfaces 41 of the centering jig Y need to have, as illustrated in FIG. 3B, the two points opposed to each other in the edge portions 21 through an intermediation of the axial center a of each of the journals 4, specifically, have two points (e and E) on the elliptically longitudinal side. In this case, it is possible to stabilize the contact state of the centering jig Y with respect to the edge portions 21 of each of the journals 4, and hence possible to reliably perform centering on each of the journals 4.

As described above, in the tripod-type constant-velocity universal joint and the method of manufacturing the same according to the present invention, by forging, the edge portions 21 serving as centering references can be formed to each of the journals 4.

As a result, it becomes unnecessary to perform, after molding each of the journals 4 by forging, a conventional step of forming a centering reference by turning and burring the leading end portion thereof. Thus, it becomes unnecessary to enlarge the journal raw profile 54 in consideration of turning amount of the leading end portion, whereby weight of the journal raw profile 54 can be reduced. Further, it is unnecessary to turn or burr the leading end portion of each of the journals 4, and hence it is possible to reduce the number of manufacturing steps of the tripod-type constant-velocity universal joint 1, thereby possible to achieve manufacturing cost reduction of the tripod-type constant-velocity universal joint 1.

Further, the entire of the leading end portion of the journal raw profile 54 is not held with use of the die X, and hence the journal raw profile 54 is held at less points of the die X as compared with conventional cases. Thus, it is possible to reduce the load applied to the die X, and possible to increase the life of the die X. In addition, in order to bring the inner walls (tapering surfaces 33) of the die X and the leading end corner portion 32 of the journal raw profile 54 into close contact with each other, it is unnecessary to strictly regulate, unlike the conventional cases, conditions at the time of forging the journal raw profile 54 (size of journal raw profile 54, setting condition of the forging machine, and the like). Therefore, forging of the tripod-type constant-velocity universal joint 1 is facilitated.

Note that, the shapes of the edge portions 21 are not limited to those in this embodiment. As long as being caused to abut against the centering jig Y so as to perform centering, the sizes, the shapes, and the positions thereof are not particularly limited. Owing to this, even when the inner walls of the part at which the leading end corner portion 32 of the journal raw profile 54 is held do not constitute the tapering surfaces 33, as long as the leading end corner portion 32 of the journal raw profile 54 can be held in a state in which the relief portion 35 is provided on the leading end side of the journal raw profile 54, and the edge portions 21 serving as the centering references can be formed on an outer peripheral surface of each of the forged journals 4, the shape, the size, and the like of the die X is not particularly limited.

However, as in this embodiment, when the inner walls of the part of the die X at which the leading end corner portion 32 of the journal raw profile 54 is held constitute the tapering surfaces 33, at the time of holding the journal raw profile 54 with use of the die X, owing to plastic flow of the journal raw profile 54, the journal raw profile 54 and the inner walls of the die X become easier to come into contact with each other. Therefore, it becomes easier to form the centering references (edge portions 21) to each of the journals 4.

While the embodiment of the present invention has been described above, those are merely exemplified, and hence various modifications can be made thereto without departing from the technical idea described in Scope of Claims.

For example, in this embodiment, the present invention is applied to the tripod-type constant-velocity universal joint of a double-roller type. However, the present invention is also applicable to well-known tripod-type constant-velocity universal joints such as a tripod-type constant-velocity universal joint of a single-roller type.

Further, in the embodiment illustrated herein, while the centering references (edge portions) are formed on the elliptically longitudinal side of each of the journals, in the case of a tripod-type constant-velocity universal joint in which the journals have a circular shape in lateral cross-section and the outer peripheral surface of each of the journals and an inner peripheral surface of each of the rollers are held in contact with each other over the circumferential direction, the edge portions can be formed over the outer peripheral surface of each of the journals in circumferential directions thereof, the rollers being each supported on the outer peripheral surface and serving as a torque transmitting means. In this case, it is necessary to perform centering on each of the journals while two points opposed to each other in the edge portions through an intermediation of the axial center of each of the journals or the entire circumference thereof is held in contact with the centering jig.

The invention claimed is:

1. A method of manufacturing a tripod-type constant-velocity universal joint which comprises:
    an outer joint member having an inner peripheral surface in which three linear track grooves extending in an axial direction are formed;
    a tripod member which has three journals protruding in a radial direction and is arranged on an inside of the outer joint member; and
    a torque transmitting element supported by means of each of the journals and guided along a roller guide surface of each of the track grooves,
    wherein, when a journal raw profile is forged with use of a die, in a state in which a relief portion is provided on a leading end side of the journal raw profile with use of the die, a part including two points opposed to each other in a leading end corner portion of the journal raw profile through an intermediation of an axial center is held with use of the die.

2. A method of manufacturing a tripod-type constant-velocity universal joint according to claim 1, wherein inner walls of a part of the die, at which the leading end corner portion of the journal raw profile is held, exhibit shapes of being narrowed toward the leading end side of the journal raw profile.

3. A method of manufacturing a tripod-type constant-velocity universal joint according to claim 2, wherein the inner walls of the part of the die, at which the leading end corner portion of the journal raw profile is held, have tapering surfaces.

4. A method of manufacturing a tripod-type constant-velocity universal joint according to claim 3, wherein:
the journal raw profile has an elliptical shape in the lateral cross-section; and
a part comprising an elliptically longitudinal side of the leading end corner portion of the journal raw profile is held with use of the die.

5. A method of manufacturing a tripod-type constant-velocity universal joint according to claim 2, wherein:
the torque transmitting element comprises
an outer roller inserted into each of the track grooves of the outer joint member, and
an inner roller arranged on an inner peripheral side of the outer roller and fitted around each of the journals; and
each of the journals has a straight shape of being orthogonal to an axial line of the joint in vertical cross-section, and has such a shape in lateral cross-section that the journal is in contact with an inner peripheral surface of the inner roller in a direction orthogonal to the axial line of the joint and a gap is formed between the journal and the inner peripheral surface of the inner roller in a direction of the axial line of the joint.

6. A method of manufacturing a tripod-type constant-velocity universal joint according to claim 5, wherein:
the journal raw profile has an elliptical shape in the lateral cross-section; and
a part comprising an elliptically longitudinal side of the leading end corner portion of the journal raw profile is held with use of the die.

7. A method of manufacturing a tripod-type constant-velocity universal joint according to claim 2, wherein:
the journal raw profile has an elliptical shape in the lateral cross-section; and
a part comprising an elliptically longitudinal side of the leading end corner portion of the journal raw profile is held with use of the die.

8. A method of manufacturing a tripod-type constant-velocity universal joint according to claim 1, wherein:
the torque transmitting element comprises
an outer roller inserted into each of the track grooves of the outer joint member, and
an inner roller arranged on an inner peripheral side of the outer roller and fitted around each of the journals; and
each of the journals has a straight shape of being orthogonal to an axial line of the joint in vertical cross-section, and has such a shape in lateral cross-section that the journal is in contact with an inner peripheral surface of the inner roller in a direction orthogonal to the axial line of the joint and a gap is formed between the journal and the inner peripheral surface of the inner roller in a direction of the axial line of the joint.

9. A method of manufacturing a tripod-type constant-velocity universal joint according to claim 8, wherein:
the journal raw profile has an elliptical shape in the lateral cross-section; and
a part comprising an elliptically longitudinal side of the leading end corner portion of the journal raw profile is held with use of the die.

10. A method of manufacturing a tripod-type constant-velocity universal joint according to claim 1, wherein:
the journal raw profile has an elliptical shape in the lateral cross-section; and
a part comprising an elliptically longitudinal side of the leading end corner portion of the journal raw profile is held with use of the die.

11. A tripod-type constant-velocity universal joint, comprising:
an outer joint member having an inner peripheral surface in which three linear track grooves extending in an axial direction are formed;
a tripod member which has three journals protruding in a radial direction and is arranged on an inside of the outer joint member; and
a torque transmitting element supported by means of each of the journals and guided along a roller guide surface of each of the track grooves, the torque transmitting element comprising
an outer roller inserted into each of the track grooves of the outer joint member, and
an inner roller arranged on an inner peripheral side of the outer roller and fitted around each of the journals,
wherein each of the journals has a straight shape of being orthogonal to an axial line of the joint in vertical cross-section, and has an elliptical shape in lateral cross-section so that the journal is in contact with an inner peripheral surface of the inner roller in a direction orthogonal to the axial line of the joint and a gap is formed between the journal and the inner peripheral surface of the inner roller in a direction of the axial line of the joint, and
wherein each of the journals has edge portions on an outer peripheral surface thereof at a part including two points on an elliptically longitudinal side, and tapered surfaces each extending from each of the edge portions and reducing a lateral sectional area thereof toward a leading end side, while, at a part including two points on an elliptically lateral side, the outer peripheral surface keeps the straight shape to be continuous with a leading end surface.

* * * * *